(12) United States Patent
Azari et al.

(10) Patent No.: US 9,691,068 B1
(45) Date of Patent: Jun. 27, 2017

(54) PUBLIC-DOMAIN ANALYZER

(75) Inventors: David Azari, Seattle, WA (US); Lee M. Miller, Seattle, WA (US); Maksym Kovalenko, Newcastle, WA (US); Jonathan D. Sanford, Seattle, WA (US); Anthony C Martinelli, Seattle, WA (US); Alan Kipust, Mercer Island, WA (US); Kelly Watson, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 13/327,140

(22) Filed: Dec. 15, 2011

(51) Int. Cl.
*G06Q 30/00* (2012.01)
*G06F 17/30* (2006.01)
*G06Q 50/18* (2012.01)

(52) U.S. Cl.
CPC ....... *G06Q 30/00* (2013.01); *G06F 17/30861* (2013.01); *G06Q 50/184* (2013.01)

(58) Field of Classification Search
CPC ............................ G06Q 30/00; G06Q 50/184
USPC .................................................. 707/748, 736
See application file for complete search history.

(56) References Cited

U.S. PATENT DOCUMENTS

| | | | | |
|---|---|---|---|---|
| 6,366,296 B1* | 4/2002 | Boreczky et al. | ............ | 715/719 |
| 6,442,549 B1* | 8/2002 | Schneider | ......... | G06F 17/30286 |
| 8,302,203 B2* | 10/2012 | Yabe | ................ | G06F 17/30887 |
| | | | | 707/E17.115 |
| 8,510,312 B1* | 8/2013 | Thibaux et al. | ............. | 707/748 |
| 8,552,281 B1* | 10/2013 | Cotrone | ................ | G09B 15/00 |
| | | | | 84/477 R |
| 8,935,745 B2* | 1/2015 | Brock | ............... | G06F 17/30864 |
| | | | | 709/223 |
| 9,208,452 B2* | 12/2015 | Wilbrink | ................ | G06Q 10/00 |
| 9,224,145 B1* | 12/2015 | Evans | ................ | G06Q 20/1235 |
| 2002/0054083 A1* | 5/2002 | Boreczky et al. | ............ | 345/738 |
| 2002/0087599 A1* | 7/2002 | Grant | .................. | G06F 17/3061 |
| | | | | 715/229 |
| 2002/0178082 A1* | 11/2002 | Krause | ................... | G06Q 30/08 |
| | | | | 705/26.1 |
| 2002/0194481 A1* | 12/2002 | Roelofsen | ............... | G06F 21/10 |
| | | | | 713/176 |
| 2003/0037010 A1* | 2/2003 | Schmelzer | ........ | G06F 17/30026 |
| | | | | 705/67 |
| 2003/0061490 A1* | 3/2003 | Abajian | ........................ | 713/176 |
| 2003/0120928 A1* | 6/2003 | Cato | .................. | H04L 63/0428 |
| | | | | 713/176 |
| 2004/0096107 A1* | 5/2004 | Ii et al. | .......................... | 382/224 |

(Continued)

FOREIGN PATENT DOCUMENTS

| | | | | | |
|---|---|---|---|---|---|
| CN | 103123634 A | * | 5/2013 | ............ | G06F 17/30 |
| WO | WO 2008048034 A1 | * | 4/2008 | ............ | G06F 21/00 |
| WO | WO 2010025390 A2 | * | 3/2010 | ............ | G06Q 10/00 |

*Primary Examiner* — Phuong Thao Cao
(74) *Attorney, Agent, or Firm* — Lee & Hayes, PLLC

(57) ABSTRACT

Some implementations include searching for and analyzing public-domain-status information about works (such as e-books) over the Internet. A computer system may search for works recently made available online that are categorized as being in the public domain. Associated metadata is analyzed to generate a confidence level regarding whether the works are in the public domain or protected by copyright. Based on the confidence level, decisions can be made, such as whether to make the works available for free in a particular country.

21 Claims, 5 Drawing Sheets

(56) References Cited

U.S. PATENT DOCUMENTS

| | | | |
|---|---|---|---|
| 2005/0125528 A1* | 6/2005 | Burke, II | H04L 63/10 709/223 |
| 2005/0172080 A1* | 8/2005 | Miyauchi | G06F 12/121 711/136 |
| 2006/0059192 A1* | 3/2006 | Chun et al. | 707/103 R |
| 2006/0155652 A1* | 7/2006 | Colby | G06F 21/10 705/59 |
| 2007/0106660 A1* | 5/2007 | Stern et al. | 707/5 |
| 2007/0214130 A1* | 9/2007 | Miller | 707/5 |
| 2007/0265854 A1* | 11/2007 | Wilbrink | G06Q 30/00 705/1.1 |
| 2008/0004120 A1* | 1/2008 | Van Luchene et al. | 463/42 |
| 2008/0010365 A1* | 1/2008 | Schneider | G06Q 10/109 709/223 |
| 2008/0059425 A1* | 3/2008 | Brock et al. | 707/3 |
| 2008/0059461 A1* | 3/2008 | Brock et al. | 707/6 |
| 2008/0133551 A1* | 6/2008 | Wensley | G06F 21/10 |
| 2008/0281810 A1* | 11/2008 | Smyth et al. | 707/5 |
| 2009/0007274 A1* | 1/2009 | Martinez | G06F 21/10 726/27 |
| 2009/0037558 A1* | 2/2009 | Stone | G06F 21/10 709/218 |
| 2010/0036781 A1* | 2/2010 | Choi | G06F 21/105 706/12 |
| 2010/0131558 A1* | 5/2010 | Logan | G06Q 50/184 707/783 |
| 2010/0287163 A1* | 11/2010 | Sridhar | G06Q 30/02 707/740 |
| 2011/0029561 A1* | 2/2011 | Slaney | G06F 17/30247 707/772 |
| 2011/0179053 A1* | 7/2011 | Pandolfi | G06Q 10/00 707/758 |
| 2011/0225156 A1* | 9/2011 | Pavlik | 707/737 |
| 2012/0233079 A1* | 9/2012 | Miller | G06Q 50/18 705/310 |
| 2013/0064417 A1* | 3/2013 | Fernandes | G06K 9/00751 382/100 |
| 2013/0097625 A1* | 4/2013 | Thorwirth | G06F 17/30038 725/25 |
| 2013/0132727 A1* | 5/2013 | Petrovic | H04N 21/4627 713/176 |
| 2013/0190555 A1* | 7/2013 | Tubman | A61M 21/00 600/28 |
| 2013/0290487 A1* | 10/2013 | Hiribarren | H04L 65/601 709/217 |

* cited by examiner

┌─ 134

| Author(s) Contributor(s) | Title | Confidence Level | Public Domain In U.S. | Instruction/ Suggestion |
|---|---|---|---|---|
| Willis, Zackary | A Tree Grew In Brooklyn | 0.75 High Likely | Yes | Publish |
| Smith, Thomas | The Streets of San Francisco | 0.65 Medium | Likely | Review |
| Wu, Yo | My Life As A Cat | 0.34 Low | No | Reject |

Select Country ▼
United States

| Author(s) Contributor(s) | Dates | Publisher | Translator | Publication Date |
|---|---|---|---|---|
| Willis, Zackary | 1865- 1905 | XYZ, Co. | N/A | 1880 |

FIG. 4

PUBLIC-DOMAIN ANALYZER

BACKGROUND

Increasingly, original works of authorship (hereinafter "works")—such as books, music, games, and movies—are distributed in digital format to the public over the Internet. Many of these works are protected by copyright, which is a right granted to an author of the work to exclude others from copying, reproducing, or publishing the work under the copyright laws of a particular country. In most countries, it is usually illegal to copy a work protected by copyright without authorization of the copyright holder. An author may include an individual, a business entity, or other type of entity, each of which are sometimes referred to as "copyright holders." Thus, in most countries it is illegal to copy or distribute a copyrighted work without authorization of the copyright holder.

The duration of protection afforded by a copyright is country specific. For instance, in the United States copyright protection, may last for the life of the author plus 70 years for any work created after Jan. 1, 1978. Similarly, in the case of a joint work prepared by two or more authors who did not work for hire, the copyright term in the U.S. endures for 70 years after the last surviving author's death. For a work authored by a corporate entity after Jan. 1, 1978, copyright protection in the U.S. endures for the shorter of 95 years from the date of publication, or 120 years from its creation. Alternatively, for works created before 1978, the length of copyright protection in the U.S. is dependent upon several different factors, such as when the works were published, whether the work used the proper copyright © notice, whether the copyright was formally renewed, and whether the work was "restored."

In other countries copyright durations vary on a country-by-country basis, based on a myriad of rules and factors. In most countries, however, copyrights generally last for 50, 75 or 100 years after the author's death. So, in some situations, a copyright covering a particular work may expire in one country, while copyrights covering the same work remain in force in other countries, and vice versa.

When copyright protection expires in a particular country, the work passes into the "public domain," in that country. That is, the work becomes a "public-domain work"—i.e., the work is no longer protected by the copyright laws of the particular country—and may generally be copied and used without restriction in that particular country. There may be other reasons why a work passes into the public domain, such as (1) the author failed to satisfy statutory formalities to perfect the copyright, (2) the work is dedicated to the public by the copyright holder, or (3) the work was created by the government, such as the U.S. government, free of restriction.

It is challenging for digital-content distributors to comply with the many different copyright laws around the world, while also keeping up with demand to continuously make public-domain works in digital format available on a country-by-country basis.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 shows one or more portions of example user-interface elements, which may be displayed on a review device.

DETAILED DESCRIPTION

Overview

Figure 1:
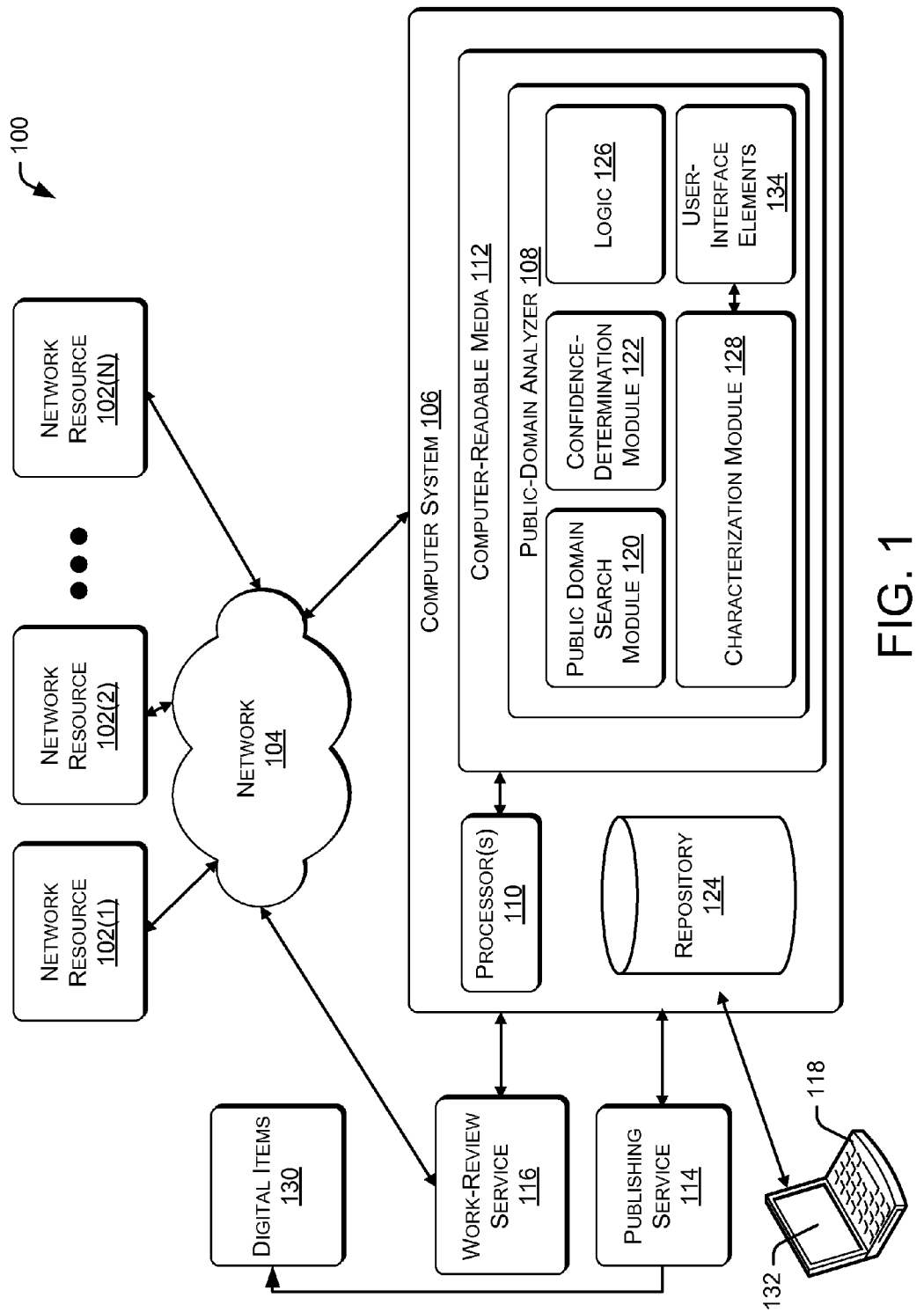
FIG. 1 is a block diagram illustrating an example computing environment in which a public-domain analyzer is implemented.

It is often tedious, inefficient, and expensive to research whether a work is protected by copyright in one or more countries. To overcome these and other deficiencies, described herein is a public-domain analyzer for automatically detecting when works purporting to be in the public domain are made available online, and verifying whether these works are in the public domain.

As used herein the public domain generally means a realm in which a work is not protected by copyright in a particular country because the copyright expired or is no longer in effect (if ever) for other reasons. A work in the public domain is sometimes referred to as a "public-domain work," and may generally be used freely by the public without restriction of the copyright laws in the particular country.

In one example, public-domain-status information regarding a work is gathered and/or searched for by a public-domain analyzer. The public-domain-status information may include any metadata about a work that may be useful in determining whether a work is in the public domain or not. Such metadata and/or information may include an author's a title of the work, an author of the work, an owner of the work, a publisher of the work, an illustrator of the work, a translator of the work, a date of birth for the creator of the work, a date of death for the creator of the work, a publication date of the work, and so forth.

A set of metadata about the work is derived from the public-domain-status information. The set of metadata is analyzed, and a confidence level is generated indicative of whether the work is in the public domain or is likely protected by copyright in a particular country.

In another example, if the confidence level corresponding to the work exceeds a threshold level, a digital item corresponding to the work may be made available for download to the public in the particular country.

On the other hand, if the confidence level corresponding to the work falls below a threshold level, then the work may be considered protected by copyright in a particular country. Additionally, a recommendation may be automatically generated to not make the work available for free in the particular country, and a digital item corresponding to the work is not made available for download to the public in the particular country.

The public-domain analyzer and related methodologies described herein may be implemented in a number of ways. Example implementations are provided below with reference to the following figures.

This overview is provided to introduce a selection of concepts in a simplified form that are further described below. This overview is not intended to identify key features or essential features of the claimed subject matter, nor is it necessarily intended to be used as an aid in determining the scope of the claimed subject matter.

Although some of the discussion herein focuses on works that are books and other publications, methodologies and principles described herein are not necessarily limited to books or publications, and may be applied to other works which may be provided as digital items over a network, such as the Internet.

Example—Computing Environment

FIG. 1 is a block diagram illustrating an example computing environment 100 in which a public-domain analyzer is implemented. Computing environment 100 may include network resources 102(1), 102(2), . . . 102(N), a network 104, and a computer system 106 configured with an example public-domain analyzer 108. Each will now be described in more detail.

Network resources, referred to generally as reference number 102, represent any physical or virtual component with availability to a network, such as network 104. In one example, network resources 102 may represent websites hosted by one or more servers (not shown). For instance, websites may include the Gutenberg Project (www.gutenberg.org), the U.S. library of congress (www.loc.gov), and various other websites from which digital content is distributed, and/or public-domain-status information may be accessed. In some instances, the public-domain-status information about a particular work or digital item may reside across several disparate network resources 102. Public-domain-status information may also be obtained from other sources (not shown) such as books, court records, hospital records, and so forth. In such situations, the public-domain-status information may not initially be in digital format, and may need to be converted into digital format.

Network 104 provides access to network resources 102. Network 104 may include one or more portions of the Internet, a wide-area network, a local-area network, a satellite-communication network, a cellular-telephone-communications network, or a communications interface, or a combination of the foregoing. Although shown as receiving data and information over network 104, it is appreciated by those skilled in the art, that any computer, including computer system 106, may receive data from an intermediary device such as a universal-serial bus (USB) storage device or other devices.

Computer system 106 may represent any suitable computing device(s) having one or more processor(s) 110 and the ability to access a computer-readable media 112. Processor(s) 110 interact with computer-readable media 112 to execute instructions and to facilitate operation of public-domain analyzer 108. Processor(s) 110 may be distributed in more than one computer system and over network 104. Examples of computer systems 106 may include, but are not limited to, a server, a personal computer, distributed-computer systems, or other computing devices having access to processor(s) and computer-readable media. Further, although not shown, any number of system busses, communication and peripheral interfaces, input/output devices, and other devices may be included in computer system 106, as is appreciated by those skilled in the art.

Computer-readable media 112 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device.

In other examples, the computer-readable media 112 may include communication media that may embody computer readable instructions, data structures, program modules, or other data in a modulated data signal, such as a carrier wave, or other transmission mechanism. As defined herein, computer-storage media does not include communication media.

Further, computer-readable media 112 may be local and/or offsite to computer system 106. For instance, one or more portions of, or all of data or code stored in computer-readable media 112, may be accessed from a computer-storage medium local to and/or remote to computer system 106, such as from a storage medium connected to network 104.

Resident in computer-readable media 112 may be one or more operating systems (not shown), and any number of other program applications or modules in the form of computer-executable instructions and/or logic which are executed on processor(s) 110 to enable processing of data or other functionality.

In communication with computer system 106 is a publishing service 114, which is shown as a logical element in environment 100. Publishing service 114 may make digital items 130 available to customers such as for purchase, rent, or for free. Publishing service 114 may make digital items 130 available for free downloads in a particular country based on a confidence level generated by public-domain analyzer 108. Publishing service 114 may also automatically print physical books using "print on demand" technology.

In one example, digital items are any work in a digital format including books music, games, videos, and movies. In some instances, the digital item and the work are the same, such as in the case of software code. In other cases, a digital item may only represent a work in its original form. For instance, in some scenarios an electronic book ("eBook") is a "digital item" representing a book, which was originally published in paper format.

In one example, a work includes an original work of authorship fixed in any tangible medium of expression, now known or later developed, from which the work can be perceived, reproduced, or otherwise communicated, either directly or with the aid of a machine or device.

Also in communication with computer system 106 is a work-review service 116 shown as a logical element in environment 100. Work-review service 116 receives one or more user-interface elements 134 (see also FIG. 4) generated by computer system 106 and public-domain analyzer 108. These user-interface elements 134 may provide information and metadata regarding one or more aspects of a work for a reviewer to view via a review device 118 (i.e., such as on a display 132 of review device 118).

Example—Public-Domain Analyzer

Computer system 106 is configured with public-domain analyzer 108 maintained in computer-readable media 112. In one example, public-domain analyzer 108 may be implemented as code in the form of computer-readable instructions that execute on one or more processors 110. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 112 may be implemented across one or more servers in a cloud computing environment, on a local device, or on a combination of both. The following discussion does not limit the implementation of code stored in computer-readable media 112 to any particular device or environment.

Public-domain analyzer 108 may include components contained in computer-readable media 112. In one example, public-domain analyzer 108 includes a search module 120, and a confidence-determination module 122.

Search module 120 searches the Internet or other networks and/or network resources for public-domain-status information. Such information may be pulled or scraped from network resources, such as various network resources 102. As one example, search module 120 scrapes or extracts public-domain-status information from network resource(s) 102. Public-domain-search module 120 may use any suitable technique to scan and crawl (i.e., collectively search) network resources 102 for public-domain-status information 108 about one or more works. For example, search module 120 may obtain a list of all works presently available from a network resource 102.

Search module 120 may keep track of works or digital items previously released by these particular network resources. Search module 120 then checks for newly released works or digital items from these sites on a continuous or periodic basis (i.e., such as on a daily, weekly, or monthly basis, or other predetermined length of time). So, search module 120 may recognize when a work/digital—purported to be in the public domain in one or more countries—is recently made available (i.e., recently released) on the Internet. In one example, a work purported to be in the public domain is an unverified assertion made by any person or entity that some work is in the public domain.

In one example, search module 120 transforms (e.g., normalizes) public-domain-status information and metadata about works, into a common format. Such normalized metadata about a work may be stored and indexed in a repository 124, which is one or more databases containing listings of metadata about works. In one example, metadata includes data about a work and/or a digital item.

As appreciated by those skilled in the art after having the benefit of this disclosure, multiple indexes may be used to with the one or more databases associated with repository 124. Although depicted as residing with computer system 106, repository 124 may reside in any computer-readable media, and may be remote to computer system 106.

In one example, search module 120 normalizes scraped public-domain-status information into a standard-data format, regardless of how the data is represented or languages—such as Chinese, English, Spanish, Portuguese, etc. used to describe works. In one example, a common format used to normalize data is an International Organization for Standardization (ISO) 639-1. As appreciated by those skilled in the art, however, after having the benefit of this disclosure, other suitable normalization formats may be used in place of, or in combination with ISO 639-1.

There are various suitable ways for search module 120 to scrape works available from a network resource 102, and check whether the works are already present in repository 124.

In one example, suppose information is scraped from the German Gutenberg website. On this site, there may be a page with a link to all public-domain works, which exists on the site. Search module 120 obtains each Hyper Text Markup Language (HTML) link corresponding to each work, and parses out a unique identifier associated with the work, such as the author's name or title (i.e. name) of a work. If the unique identifier does not exist in repository 124, search module 120 accesses a page that the HTML link leads to, and uses regular expressions to parse a set of metadata about the work from that page.

In another example, search module 120 scrapes public-domain-status information (such as metadata) from the Library of Congress' website, in which there is a paginated list of all public-domain works, each linking to a page with the metadata. Search module 120 identifies a first-index page from the Library of Congress' website, and for each work listed on that page, a set of metadata associated with the work is extracted, when it is determined that such works do not already exist in repository 124. Because there is a paginated list of works, search module 120 is able to track and search different index pages. This process of scraping information from Library of Congress' website continues until all information about works on the last index page is identified or no further index pages exist.

In still another example, search module 120 scrapes public-domain-status information from the Gutenberg organization's general website. Presently, this website permits users to download a Resource Description File (RDF) containing public-domain-status information for every work on the website, which is presently updated daily. Search module 120 pulls the RDF, and searches through the file using an XML parser or other suitable parser. Metadata associated with each work is extracted, and used to determine whether there is already information about the work stored in repository 124. If there is no information about the work stored in repository 124, then a set of metadata associated with the work is stored in repository 124.

Search module 120 may assign metadata to fields (not shown) and/or tag metadata within repository 124. For example, a title of the work, genre or the work, date of publication, date of birth of an author, date of death of an author, and so forth are all categories, in which metadata may be assigned or tagged in repository 124.

In some cases, search module 120 derives a minimum set of metadata from the normalized public-domain-status information/metadata to enable an analysis of whether or not a work/digital item is in the public domain in a particular country. The minimum set of metadata may vary depending on the rules/laws a particular country.

In one example a minimum set of metadata may include a subset of key metadata derived from the public-domain information needed to determine whether a work is in the public domain in a particular country. Additionally, any set of metadata may include one or more of the following: a title of the work, a date of birth for the creator of the work, a date of death for the creator of the work, a copyright date, and a publication date of the work.

In some situations, the quantity of metadata derived from the public-domain-status information/metadata obtained by search module 120 may be insufficient to determine with confidence whether a work has entered the public domain. For example, certain countries may require knowing the date of death of the author, whereas other countries may only require knowing the date of publication of a work, or vice versa. Missing metadata may diminish the confidence level of whether a work has entered the public domain.

Confidence-determination module 122 automatically analyzes the likelihood of whether a work is protected by copyright or is in the public domain on a country-by-country basis.

In one example, rules corresponding to a particular country's copyright laws for determining whether a work is protected by copyright or in public domain are codified in logic 126.

Confidence-determination module 122 is configured to automatically retrieve metadata corresponding to a work/digital item, and apply the corresponding metadata to logic 126 to determine whether a work is protected by copyright or in the public domain in one or more countries. Different categories of metadata may be retrieved and applied to logic 126, as needed, to determine the copyright-protection status of a work.

In another aspect, confidence-determination module 122 is also configured to generate a confidence level indicative of whether a work in a particular country has passed into the public domain, is protected by copyright, or is inconclusive.

In one example, the confidence level is a score (i.e., a value) between a first and second value, where a value closer to the first value indicates a greater probability that a work is in the public domain, protected by copyright, or inclusive, in a particular country. In another example, a confidence level may be expressed as a value or score, which signifies a degree of certainty.

As appreciated by those skilled in the art having the benefit of the disclosure, confidence levels can be determined by any suitable manner, such as using fuzzy logic, artificial intelligence, or other suitable models and techniques. Further, the actual values used (if any) and ranges may vary.

For example, confidence-determination module 122 may perform a Lucene-index search to identify a title of a public-domain work in repository 124 most relevant to a title searched for, which has been purported by at least one authoritative source to be in the public domain. Confidence-determination module 122 then selects, from repository 124, those works most likely to correspond to the work searched for. Confidence-determination module 122 performs a TF-IDF weighting (term frequency-inverse document frequency weighting), which typically returns a score of between 0 and 1, depending on whether metadata associated with two works being compared are not similar (i.e., a score of zero), similar (i.e. a score of 0.66 or more), or an exact match (i.e., a score of one). In this example, a confidence-level score is returned indicating how similar metadata is to a known (or purported) public-domain work.

Confidence-determination module 122 may also return a list of countries in which a work is considered in the public domain. The list of countries and territories may be determined based on one or more variables including: the publication date of the work, and the latest date of the death of author(s), editors, and/or translators.

Confidence-determination module 122 may also return a list of countries in which a work is not considered in the public domain, or an indication that further research needs to be performed to determine whether the work is in the public domain in a country or one or more of its territories.

In another example, confidence-determination module 122 uses thresholds to enable the rendering of confidence levels. For instance, in one implementation, a confidence level above specified threshold value may indicate that a work is in the public domain. For example, a threshold" is any value—above or below which—an assumption is made. Although the term "above" or "below" is used herein, these terms are not meant to be limiting and can be interchanged to provide the same results, as is readily appreciated by those skilled the art.

Once confidence-determination module 122 generates a confidence level, the confidence level may be recorded for further use.

A characterization module 128 is configured to characterize a work into one of a plurality of characterizations based on the determined confidence level for that work. In another example, a confidence-level value above or below a certain threshold value may also signify that a work is likely protected by copyright in a particular country. The difference between a confidence-level value and a threshold value may also signify a greater or lesser degree of confidence—which can also be characterized—and presented to a user such as on display device 132.

For example, suppose a confidence-level value of 1 is generated on a scale between zero and one, and the threshold for determining whether a work is in the public domain is 0.75. In this scenario, the confidence level may be characterized as "highly likely the work is in the public domain." On the other hand, suppose a confidence-level value of 0.75 is generated. In this scenario, the confidence level may be characterized as simply "more likely than not that the work is in the public domain."

The aforementioned thresholds are examples. Additional thresholds may be used that may signify other meanings and confidences. Further, the ranges and corresponding meanings associated with each can change, as would be readily appreciated by those skilled in the art having the benefit of this disclosure. For example, a higher-threshold value could mean a work is protected by copyright, and a lower value could signify that a work is not protected by copyright in a particular country, and vice versa.

In other embodiments, characterizations may include one or more provisional-handling categories that indicate suggested or tentative decisions regarding how to handle the work, such as whether to make a digital item available as a public-domain document, not making the digital item available for download in a particular country, or taking some other action regarding a digital item representing the work.

In the same or different embodiments, the characterizations may include one or more unequivocal handling categories indicating definite decisions regarding how to handle a digital item representing the work, such as making the digital item representing the work available for online downloading free of charge when the confidence level exceeds a threshold indicating the work is likely in the public domain. In one example, a rejected digital item is made available for purchase according to the copyright laws of a particular country, but is not made available as a free public-domain document. In another example, a rejected digital item is not made available for publication in the particular country.

Characterization module 128 may also cause an automated decision for a digital item to be made without requiring manual review of the corresponding work. For example, if the characterization module 128 categorizes a digital item into an unequivocal category, characterization module 128 may cause the digital item to be accepted for free publication (if in the public domain), or accepted for fee-based publication (if copyrighted protected).

In yet another example, characterization module 128 may be configured to categorize a digital item into an unequivocal-reject category because no determination can be made either way whether the work is protected by copyright, or the work is protected by a copyright in a particular country. Categorizing a digital item in the unequivocal-reject category causes a digital item representing the work to be automatically rejected for publication.

In various embodiments, characterization module 128 may communicate directly with publishing service 114 to automatically make a digital item representative of a work available for online downloading, e.g., free of charge, in a particular country, if the confidence level corresponding to the country exceeds a predetermined threshold.

In various embodiments, characterization module 128 may also generate user-interface elements 134 (see also FIG. 4) for eventual display on review device 118. In some embodiments, the user-interface elements may include web pages, such as web pages built with hypertext markup language (HTML) data and/or other components, for viewing with a web browser. The user interfaces may include selectable options for making publication decisions on a country-by-country basis regarding a digital item, including whether to charge a fee, publish online for free, reject publication, or flagged as requiring additional research. The user-interface elements may include aspects of the work or digital item (such as all or various portions of its digital content, all or some of its metadata), confidence levels associated with the work, and/or a tentative decision regarding whether to publish or not publish the copyrighted work.

A work-review service 116 may use one or more portions of the user interface to cause a digital item to be published as a public-domain work, or a copyrighted work on publishing service 114 based on receipt of input from review device 118 indicating a reviewer's decision on how to publish digital items.

Figure 2:
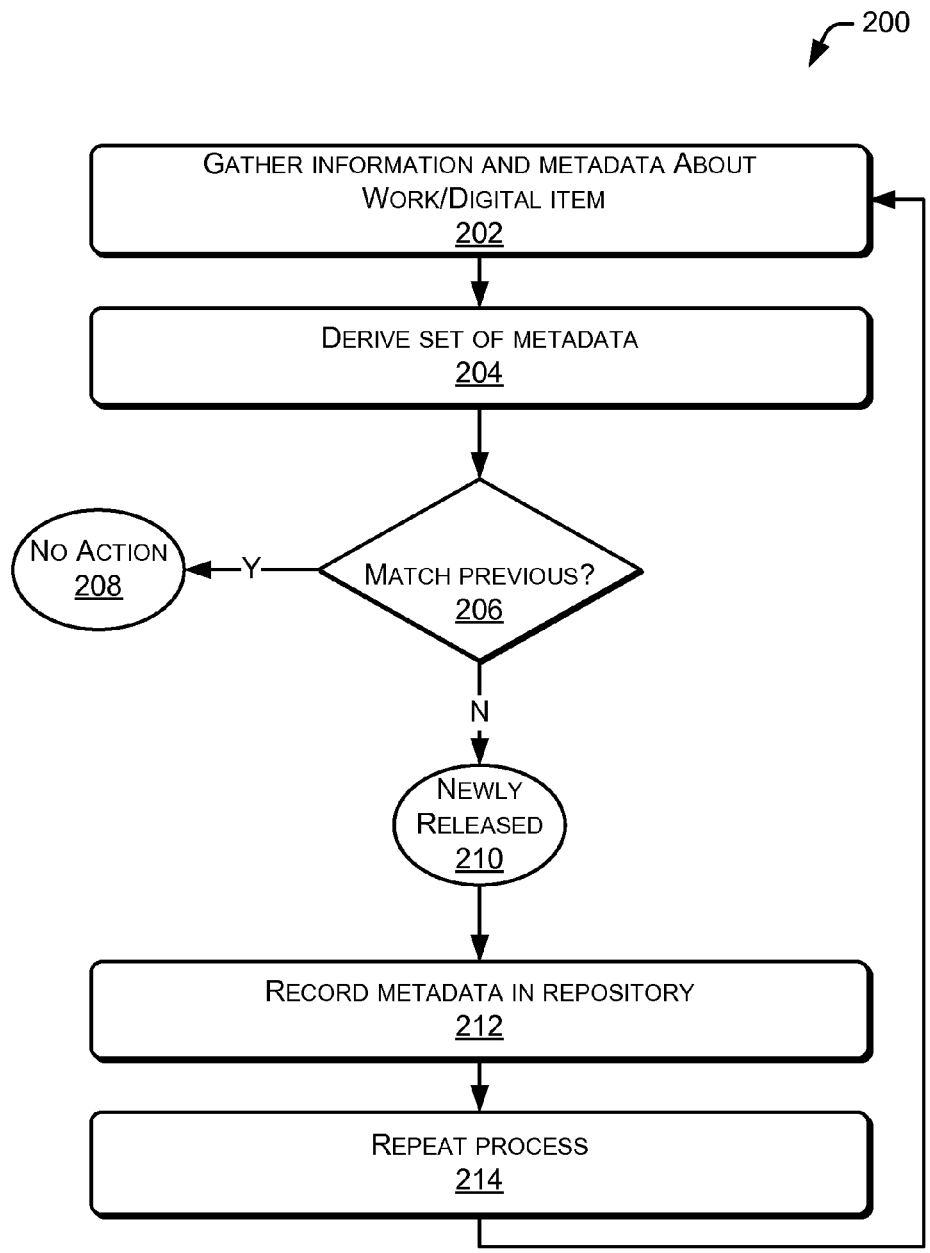
FIG. 2 shows an illustrative process for finding newly released-digital items over the Internet alleged to be in the public domain, according to various embodiments.

Illustrative Process for Finding Newly
Released-Digital Items Alleged to be in the Public
Domain FIG. 2 shows an illustrative process 200 for finding newly released-digital items alleged to be in the public domain, according to various embodiments. Process 200 may be described with reference to FIG. 1.

Process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure. Other processes described throughout this disclosure, such as in FIG. 3, in addition to process 200, shall be interpreted accordingly.

At 202, search module 120 (FIG. 1) gathers public-domain-status information or metadata about a work recently made available, and represented (i.e., purported) as being in the public domain in at least one country.

At 204, search module 120 derives a set of metadata about the work from the public-domain-status information. In deriving the set of metadata, search module 120 may normalize one or more portions of the public-domain-status information, and parse particular metadata, such as the title and author's name, from a larger set of normalized public-domain-status information about the work.

At 206, search module 120 determines whether the set of metadata about the work matches a previously recorded set of metadata corresponding to a work previously (hereinafter "recorded data") determined to be in the public domain in a particular country.

At 208, if search module 120 determines there is a match between metadata about the work and the recorded data, then an inference is made that the newly discovered digital item is already available by publishing service 114 as public-domain work, and no further action need to be taken with respect to the digital item/work or public-domain-status information associated with it.

On the other hand, at 206, if search module 120 determines there is no match between metadata about the work and the recorded data, then at 210, an inference is made that the work is a newly released digital item/work. In another example, an inference can be made that no information about the work was previously recorded in the database.

At 212, search module 120 records the metadata corresponding to the work in repository 124. For example, the following metadata is categorized and stored in a database, such as a title of the work, an author of the work, an owner of the work, a publisher of the work, an illustrator of the work, a translator of the work, a date of birth for the creator of a work, a date of death for the creator of the work, and a publication date of the work.

At 214, the process 200 repeats at some interval in the future. For example, in one example, the process of searching the Internet for public-domain-status information about newly released digital items may occur every five minutes, every hour, every other day, every seven days, every two weeks, any combination of the foregoing, and so forth. Additionally, the process 200 can be restarted at different intervals such as manually, or by some other means. For example, process 200 may automatically run after receiving one or more messages from one or more network resources 102 announcing new the release of digital item alleged to be in the public domain.

Illustrative Process for Analyzing Whether a Work
is in the Public Domain

Figure 3:
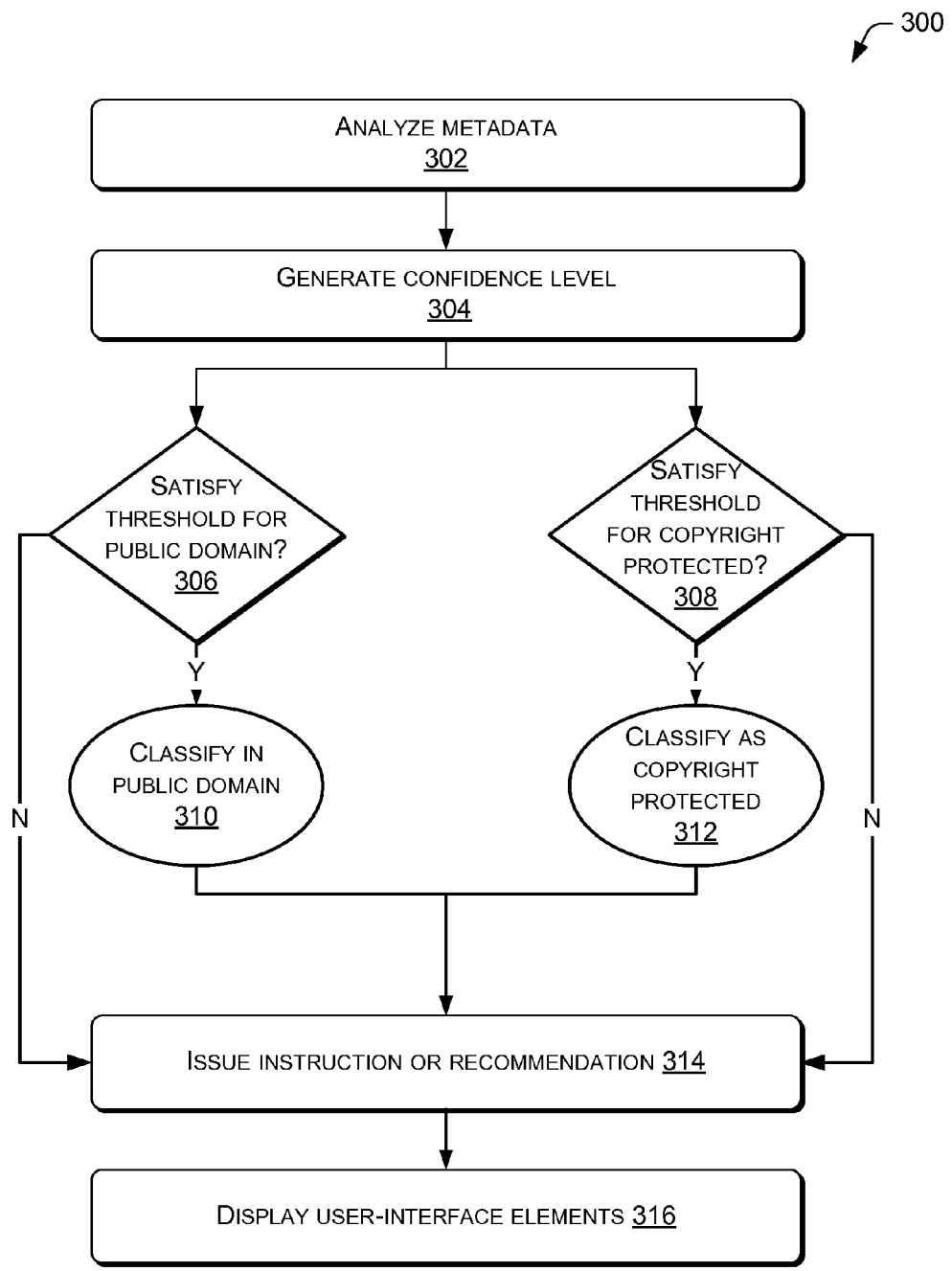
FIG. 3 shows an illustrative process for determining whether a work/digital item is in the public domain in one or more countries.

FIG. 3 shows an illustrative process 300 for determining whether a work is in the public domain in one or more countries. The operations shown in FIG. 3 may be performed by various modules associated with the public-domain analyzer 108. Process 300 is described with reference to the preceding figures, and specifically to FIG. 1.

At 302, confidence-determination module 122 analyzes one or more portions of the metadata about a work such as may be detected using process 200 (FIG. 2).

At 304, confidence-determination module 122 generates a confidence level indicative of whether the recent-digital item is in the public domain and/or is protected by copyright in one or more countries.

At 306, confidence-determination module 122 determines whether the confidence level from 304 satisfies a threshold, indicating that the digital item is likely in the public domain in a particular country. If a threshold is not satisfied in 306, process 300 may proceed to 314.

At 308, confidence-determination module 122 determines whether the confidence level from 304 satisfies a threshold, indicating that the digital item is likely protected by copyright in a particular country. If a threshold is not satisfied in 308, process 300 may proceed to 314. As appreciated by those skilled in the art having the benefit of this disclosure, determinations at 306 and 308 do not necessarily have to be independent determinations. For instance, a determination that the confidence level satisfies a threshold satisfying the copyright threshold, may render the determination of whether the digital item is in the public domain in a particular country moot, and vice versa.

At 310, confidence-determination module 122 classifies the recent-digital item as in the public domain in at least one country, based on the determination from 306.

At 312, confidence-determination module 122 classifies the recent-digital item as protected by copyright in at least one country, if the confidence level satisfies a threshold, indicating a higher level of confidence that the digital item is protected by copyright in at least one country per 308.

At 314, based on how the classifications are made at 306 and 308, computer system 106 and public-domain analyzer 108 may issue an instruction or recommendation regarding how to handle the recent-digital item, such as to publish the digital item as a public-domain work in a particular country, or reject the recent-digital item for publication in a particular country due to likely copyright protection. In one example, the instruction or recommendation may be made automatically.

At 316 various user-interface elements are displayed on a review device 118 to enable a reviewer to review confidence levels, categorizations or classifications made above, and to make a publishing decision regarding how to handle the recent-digital item, such as to submit the digital item to the publishing service 114 for online publishing as a public-domain work in particular countries, forgo publication, and so forth.

Example—User Interface Elements

FIG. 4 shows a portion of example user-interface elements 134 which may be displayed on a review device 118 (FIG. 1). As shown in FIG. 4, user-interface elements 134 includes various metadata and confidence level categories appurtenant to a work/digital item such as: an author(s)/contributor(s) category 402, a title of a work/digital item category 404, a confidence-level value category 406, a copyright/public domain indication category 408, and an instruction/suggestion category 410.

In one example, author(s)/contributor(s) category 402 lists likely authors/contributors of a corresponding work/digital item. Title of a work/digital item category 404 lists the name or title of a work/digital item. Confidence-level value category 406 lists a confidence-value level, and corresponding confidence of whether a digital item is the public domain or protected by copyright. The confidence-level value may also correspond to a threshold value to signify a greater or lesser degree of confidence Copyright/public domain indication category 408 provides another public domain/copyright status of a work/digital item. Finally, instruction/suggestion category 410 lists recommendations or instructions which may be forwarded to publishing service 114 and work-review service 116. Instruction/suggestion category 410 may include one or more provisional-handling categories that indicate suggested or tentative decisions regarding how to handle a work, such as whether to make a work available as a public-domain document (i.e., "Publish"), reject making work available for download in a particular country (i.e., "Reject"), or take some other action regarding a digital item representing the work (i.e., perform further research and "Review").

As mentioned above, these provisional-handling categories may also cause an automated decision for a digital item representing a work to be made without requiring manual review of the work. For example, if the characterization module 128 categorizes a digital item into an unequivocal category (i.e., "publish"), characterization module 128 (FIG. 1) may cause the digital item to be accepted for free publication (if in the public domain), or accepted for fee-based publication (if copyrighted protected).

In the example of FIG. 4, all user-interface elements 134 may be displayed as web pages, such as web pages built with hypertext markup language (HTML) data and/or other components, for viewing with a web browser. The user interfaces may include selectable options for making publication decisions on a country-by-country basis (such as view a pull-down menu 412) regarding a digital item, including whether to charge a fee, publish online for free, reject publication, or flagged as requiring additional research.

Additional example metadata may be displayed as part of user-interface elements 134 such as the author's data of birth/death 414, a publisher 416, a translator if applicable 418, and publication date of a work 420. Format and particular configuration of content, as well as which particular content is presented as part of user-interface elements 134 may vary as is appreciated by those skilled in the art having the benefit of this disclosure.

Example—Site-Specific-Ingestion Process

Figure 5:
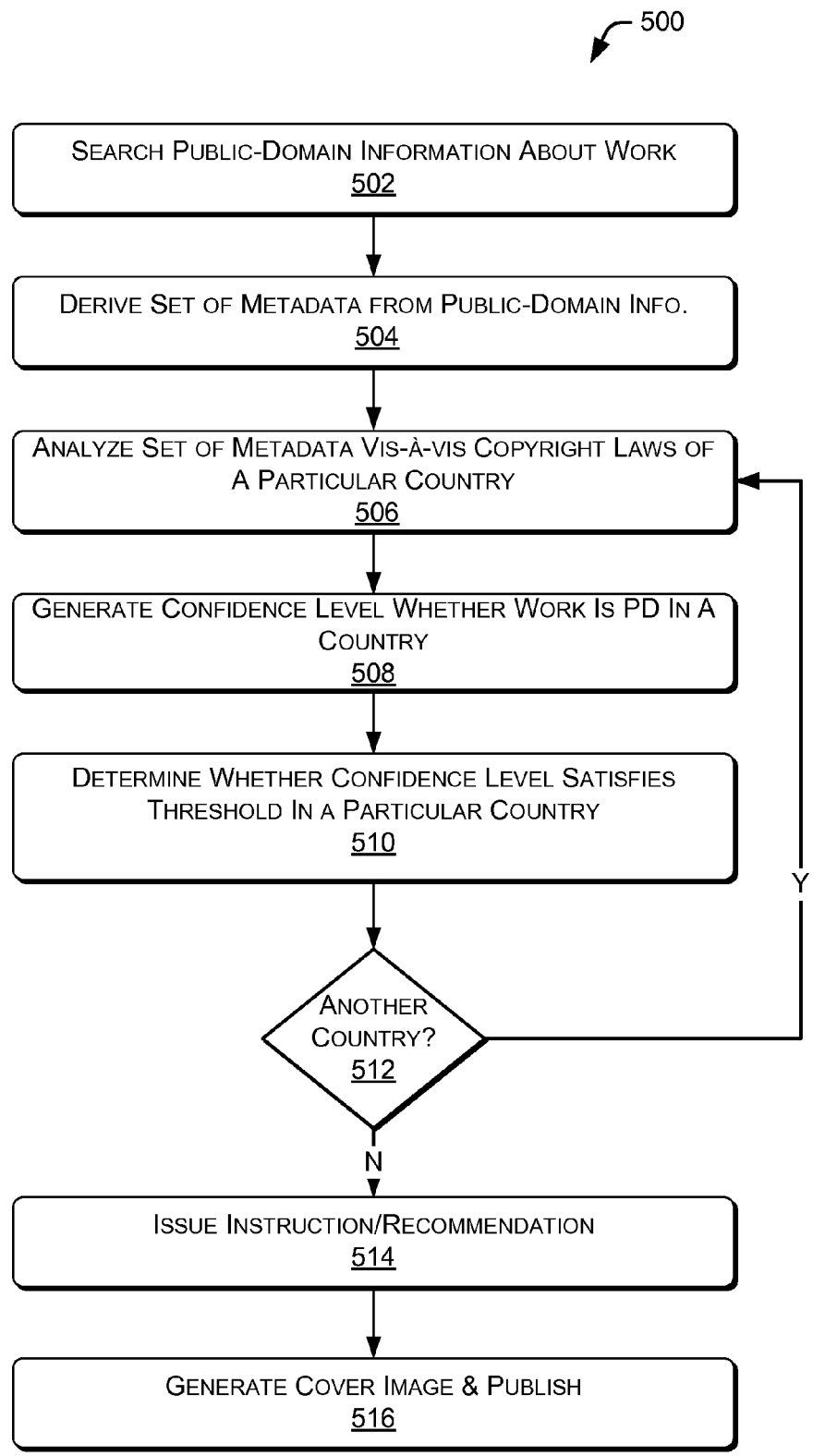
FIG. 5 illustrates another example process for determining whether a work is in the public domain in a particular country.

FIG. 5 illustrates another example process 500 for determining whether a work is in the public domain in a particular country. The operations shown in FIG. 5 may be performed by various modules associated with the public-domain analyzer 108 (FIG. 1). Process 500 is described with reference to the preceding figures, and specifically to FIG. 1.

Process 500 includes operations 502 through 516. In this example, process 500 is tailored to monitor and scrape public-domain-status information from a particular website, such as gutenberg.org or other suitable sites.

At 502, public-domain-status information about a newly released digital item is discovered. The digital item may be detected per process 200 or some other process or instruction(s). The public-domain-status information may be transformed (i.e., normalized) into a generic format or some other format, such as the Resource Description Framework (RDF).

At 504, a set of metadata is derived from the public-domain-status information. The set of metadata may include one or more portions of the public-domain-status information needed to determine whether a work is in the public domain in a particular country. The set of data may vary on a country-by-country basis, because different data parameters may be needed to determine whether a work is in the public domain based on country specific laws. Additionally, the set of data may vary due to different quantities of public-domain-status information available from a site or other network resources.

At 506, the set of metadata is analyzed based on the particular rules of the country in which a determination is being made whether the work is copyright protected or in the public domain.

At 508, a confidence level is generated whether the work is in the public domain in the particular country. The confidence level may be a value, a characterization corresponding to a value, or some other indicator of whether a work is in the public domain or not.

At 510, a determination is made whether value associated with a confidence level satisfies a threshold for a particular country. The determination is made whether the value associated with a confidence level either: (i) satisfies or (ii) fails to satisfy a predetermined threshold value for that particular country.

At 512, a determination is made whether to perform the copyright/public domain determination in other countries. For instance, if there is a desire to perform copyright/public domain determination in another country, then process 500 proceeds to 506, and steps 506, 508 and 510 are repeated by applying the rules/laws of one or more other particular countries.

At 514, an instruction (such an automatic command) or recommendation may be issued whether to publish a work in a country, such as a public domain document based, in part, on the determinations made per 506, 508 and 510. In one example, the instruction or recommendation is to publish the digital item or work in the particular country.

At 516, a cover is generated to associate with the digital item or work. The cover may be displayed on a website of a publishing service 114 (FIG. 1). The content of the cover may correspond to the title of the work, the genre of the work, or additional information associated with the work, such as prior covers used with the work, such as if the work is a book. The work may now be published by a publishing service 114.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method under control of one or more computing systems configured with specific executable instructions, the method comprising:
    obtaining information about a work from one or more network resources;
    deriving metadata of the work from the information obtained about the work;
    determining, based at least in part on copyright laws of a country, that a subset of the metadata has a minimum amount of information to make a determination related to the work being in the public domain for the country;
    generating, based at least partly on the subset of the metadata, a numerical confidence level indicative of the work being in the public domain for the country or the work being protected by copyright in the country;
    comparing the numerical confidence level to a predetermined threshold value for the country;
    determining that the numerical confidence level is above the predetermined threshold value;
    determining, based at least partly on the numerical confidence level being above the predetermined threshold value, a recommendation to make the work available as a public domain document in the country; and
    generating a user interface that includes the numerical confidence level and the recommendation.

2. The method of claim 1, wherein the metadata about the work includes at least one of: a title of the work, an author of the work, an owner of the work, a publisher of the work, an illustrator of the work, a translator of the work, a date of birth for a creator of the work, a date of death for the creator of the work, or a publication date of the work.

3. The method of claim 1, wherein the user interface includes a selectable option to perform an action corresponding to the recommendation.

4. The method of claim 1, further comprising:
    obtaining additional information about an additional work from the one or more network resources;
    deriving additional metadata of the additional work from the additional information obtained about the additional work; and
    generating, based at least partly on at least a portion of the additional metadata and on the copyright laws of the country, an additional numerical confidence level indicative of the additional work being in the public domain for the country or the additional work being protected by copyright in the country.

5. The method of claim 4, further comprising:
    comparing the additional numerical confidence level to the predetermined threshold value for the country;
    determining that the additional numerical confidence level is below the predetermined threshold value; and
    classifying the additional work as being protected by copyright in the country based at least partly on the additional numerical confidence level being below the predetermined threshold value.

6. The method of claim 5, further comprising making the work available for purchase based at least partly on determining that the additional work is protected by copyright in the country.

7. A method under control of one or more computing systems configured with specific executable instructions, the method comprising:
    gathering metadata about a work;
    determining that the work is in the public domain;
    storing at least a portion of the metadata of the work in a repository of works that are in the public domain;
    extracting additional metadata of an additional work from a network resource;
    determining, based on at least a portion of the additional metadata, that the additional work is not stored in the repository;
    generating, based at least in part on the additional metadata, a numerical confidence level indicative of the additional work passing into the public domain or the additional work being protected by copyright in a country;
    determining, based at least partly on the numerical confidence level, a recommendation of one of: making the additional work available as a public domain document, making the additional work available for download in the country, or performing further research related to a public domain status of the additional work in the country; and
    causing display of a user-interface element including the numerical confidence level and the recommendation.

8. The method of claim 7, further comprising causing display of the numerical confidence level and at least a portion of the additional metadata appurtenant to at least a portion of the additional work in a user-interface element on a computer.

9. The method of claim 7, further comprising periodically searching a network resource for the additional metadata of the additional work.

10. The method of claim 7, wherein the metadata includes at least one of: a title of the work, an author of the work, an owner of the work, a publisher of the work, an illustrator of the work, a translator of the work, a date of birth for a creator of the work, a date of death for the creator of the work, or a publication date of the work.

11. The method of claim 7, further comprising characterizing the additional work as being in the public domain at least partly based on the numerical confidence level exceeding a threshold.

12. The method of claim 7, further comprising characterizing the additional work as being protected by copyright at least partly based on the numerical confidence level being below a threshold value.

13. The method of claim 7, further comprising characterizing the additional work as being in the public domain at least partly based on the numerical confidence level exceeding a threshold value, and making the additional work available for download as a digital item in the country.

14. The method of claim 7, further comprising comparing at least a portion of the additional metadata to logic representative of laws in the country.

15. The method of claim 7, further comprising comparing at least a portion of the metadata to the additional metadata.

16. The method of claim 7, further comprising rejecting free dissemination of the additional work in the country at least partly based on the numerical confidence level being below a threshold value indicating that the additional work is protected by copyright in the country.

17. The method of claim 7, wherein the generating the numerical confidence level includes comparing at least a portion of the additional metadata to the metadata corresponding to the work previously determined to be in the public domain, and the numerical confidence level indicates a similarity between the metadata with the at least a portion of the additional metadata.

18. A system comprising:
one or more processors; and
non-transitory computer-readable media communicatively coupled to the one or more processors, the non-transitory computer-readable media comprising computer-readable instructions that, upon execution by the one or more processors, cause the system to perform operations comprising:
scanning network resources periodically for information about a work;
deriving a set of metadata about the work from the information;
normalizing the set of metadata to a format that is independent of a language in which the work was created;
searching a repository based on the set of metadata to determine that at least a portion of the set of metadata is included in the repository, the repository including additional metadata associated with additional works in the public domain;
generating, based at least in part on the at least a portion of the set of metadata being included in the repository, a numerical confidence level indicative of the work being in the public domain or the work being protected by copyright in a country of a plurality of countries;
determining that the numerical confidence level is above a predetermined threshold value for the country; and
determining that the work is in the public domain of the country.

19. The system of claim 18, wherein the operations further comprise:
obtaining additional information about an additional work from the network resources;
deriving additional metadata of the additional work from the additional information obtained about the additional work; and
generating, based at least partly on at least a portion of the additional metadata and on copyright laws of the country, an additional numerical confidence level indicative of the additional work being in the public domain for the country or the additional work being protected by copyright in the country.

20. The system of claim 19, wherein the operations further comprise:
comparing the additional numerical confidence level to the predetermined threshold value for the country;
determining that the additional numerical confidence level is below the predetermined threshold value; and
characterizing the additional work as requiring additional research to determine that the additional work is protected by copyright in the country or that the additional work is in the public domain.

21. Non-transitory computer-readable media comprising a plurality of programming instructions that, upon execution by one or more processors of a computing system, cause the computing system to:
scan network resources periodically for information about a work;
derive a set of metadata about the work from the information;
normalize the set of metadata to a format that is independent of a language in which the work was created;
search a repository based on the set of metadata to determine that the work is not included in the repository, wherein the repository stores works included in the public domain;
analyze the set of metadata using logic representative of copyright laws of a plurality of countries;
generate, based at least in part on the analyzing of the set of metadata, a numerical confidence level indicative of the work being in the public domain or the work being protected by copyright in a country of the plurality of countries;
determine, based at least partly on the numerical confidence level, a recommendation to one of: make the work available as a public domain document, make the work available for download in the country, or perform further research related to a public domain status of the work in the country; and
cause display of a user-interface element including the numerical confidence level and the recommendation.

* * * * *